(12) United States Patent
Palin et al.

(10) Patent No.: US 10,209,067 B2
(45) Date of Patent: Feb. 19, 2019

(54) DEVICE FOR A COMPASS

(71) Applicant: Suunto Oy, Vantaa (FI)

(72) Inventors: Henrik Palin, Vantaa (FI); Tuomo Nousiainen, Vantaa (FI); Matti Muhonen, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 15/993,681

(22) Filed: May 31, 2018

(65) Prior Publication Data

US 2018/0356224 A1   Dec. 13, 2018

(30) Foreign Application Priority Data

Jun. 7, 2017 (FI) .................................. 20175523
Jun. 7, 2017 (GB) ................................. 1709036.6

(51) Int. Cl.
*G01C 17/10* (2006.01)

(52) U.S. Cl.
CPC .................................. *G01C 17/10* (2013.01)

(58) Field of Classification Search
CPC ........ G01C 17/04; G01C 17/38; G01C 17/00; G01C 5/00; G01C 5/06; G01C 17/06; G01C 17/20; G01C 17/28; G01C 17/30
USPC ...................................................... 33/355 R
See application file for complete search history.

(56) References Cited

U.S. PATENT DOCUMENTS

| 52,233,759 | | 8/1993 | Gloor et al. | |
| 6,094,830 A | * | 8/2000 | Gloor | G01C 17/06 33/272 |
| 6,105,265 A | * | 8/2000 | Gloor | F28F 13/10 33/355 D |
| 6,140,933 A | * | 10/2000 | Bugno | B60R 1/12 33/333 |
| 7,600,430 B2 | * | 10/2009 | Palin | G01L 19/0654 368/11 |

FOREIGN PATENT DOCUMENTS

| AT | 328760 B | 4/1976 |
| GB | 821719 A | 10/1959 |
| JP | 2001194143 A | 7/2001 |
| WO | WO8503347 A1 | 8/1985 |

* cited by examiner

*Primary Examiner* — Yaritza Guadalupe
(74) *Attorney, Agent, or Firm* — Seppo Laine Oy (57) ABSTRACT

According to an example aspect of the present invention, there is provided a device for a compass, the device comprising a support comprising a magnetic field detection means being mounted via a conical pivot bearing on a tip of a shaft, wherein the detection means is capable of rotating in at least a plane which is perpendicular to the direction of the shaft, a direction indicator device connected to the magnetic field detection means, and wherein the support comprises an upper portion, a middle portion and a lower portion, the direction indicator device comprises an elongate plate with a direction indicator, wherein the middle portion of said support extends through an opening in the plate, the upper portion of said support comprises opposite first members extending over the top surface of said plate, and the lower portion of said support comprises opposite second members extending under the bottom surface of said plate, and said first and second members are vertically and pairwise aligned to form a first fork and a second fork for supporting the plate.

19 Claims, 8 Drawing Sheets

DEVICE FOR A COMPASS

FIELD

The present invention relates to a device for a compass. In particular, the present invention relates to a tilt-compensating and/or inclination-compensating indicator device for a compass having a magnetic field detection means which is mounted on a conical pivot bearing and which is located in a housing of the compass. Additionally, the present invention relates to the use of a device in a housing of a compass.

BACKGROUND

A magnetic compass is a device for determining direction. Typically, it includes a magnetized needle supported for rotation within a capsule or casing having a transparent cover. The needle, which acts as a pointer, aligns itself with the earth's magnetic field, a scale to specify direction relative to this magnetic field. The scale may be marked in degrees, for instance. The compasses may make use of iron alloys or ferrite magnets capable of permanently maintaining a strong magnetization. In a magnetic compass, it is conventional to mount the needle on a pointed staff serving as a fulcrum, the point of the staff being received in a jewel bearing to minimize the friction so that the needle is free to tilt as well as to rotate.

Document U.S. Pat. No. 6,105,265 describes a tilt-compensating indicator device for a compass comprising a magnetic field detection device which is mounted on a conical bearing and is accommodated in a housing of the compass. The indicator device is rotatably mounted on the magnetic field detection device by means of a receiving bearing whose bearing shaft, accommodated in bearing elements of the magnetic field detection device, extends substantially at right-angles to the north-south direction of the magnetic field detection device.

Further, document U.S. Pat. No. 6,094,830 discloses a compass comprising an at-least-partially-transparent housing having a top and a bottom, a vertically orientated, conical pivot bearing, and a magnetic detection means which is mounted on the vertically-oriented conical pivot bearing. The magnetic detection means thereby is capable of rotating in a substantially-horizontal plane. The magnetic field detection means is provided with a radially-extending, tilt-compensating, indicator device. The indicator device has at least one spacer element which is spaced from the magnetic field detection means, the spacer element projecting from the indicator device and being directed towards one of a top of the housing of the compass and a bottom of the housing of the compass. By this structure, the indicator device is guidable in the housing of the compass substantially-parallel to at least one of the top of the housing of the compass and the bottom of the housing of the compass by being mechanically pushed off at least from one of the top of the housing of the compass and the bottom of the housing of the compass by the spacer element when the housing is tilted. In addition, the spacer element which is arranged on the indicator device is oriented in respect to the top of the housing of the compass or the bottom of the housing of the compass in such a manner that an abutting of the indicator device against the housing of the compass can be prevented.

Additionally, document U.S. Pat. No. 5,233,759 teaches a tilt-compensating magnetic compass formed by a capsule enclosing a rotatable pointer to indicate direction and a rotatable magnetic-field detector provided with a permanent magnet. The detector, which is rotatable about an axis colinear with the axis about which the pointer rotates, orients itself with respect to the earth's magnetic field, the detector being tiltable to a degree depending on the inclination of the magnetic field and on the attitude of the compass with respect to the horizontal plane. The detector is mechanically linked to the pointer so that rotation of the detector results in a corresponding rotation of the pointer regardless of the degree of tilt, whereby the pointer accurately indicates direction. The linkage consists of a pin projecting from the detector and passing through a slot in a fork extending from the pointer, whereby when the detector tilts, the pin then shifts within the slot, but remains coupled to the fork to maintain the linkage without imparting movement to the pointer.

In view of the foregoing, it would be beneficial to provide a device for a compass comprising a tilt-compensating and/or inclination-compensating indicator device. Such device for a compass should be capable of being manufactured simply, cost effectively, and in industrial scale.

SUMMARY OF THE INVENTION

The invention is defined by the features of the independent claims. Some specific embodiments are defined in the dependent claims.

According to a first aspect of the present invention, there is provided a device for a compass, the device comprising a support comprising a magnetic field detection means being mounted via a conical pivot bearing on a tip of a shaft, wherein the detection means is capable of rotating in at least a plane which is perpendicular to the direction of the shaft, a direction indicator device connected to the magnetic field detection means, and wherein the support comprises an upper portion, a middle portion and a lower portion, the direction indicator device comprises an elongate plate with a direction indicator, wherein the middle portion of said support extends through an opening in the plate, the upper portion of said support comprises opposite first members extending over the top surface of said plate, and the lower portion of said support comprises opposite second members extending under the bottom surface of said plate, and said first and second members are vertically and pairwise aligned to form a first fork and a second fork for supporting the plate.

Various embodiments of the first aspect may comprise at least one feature from the following bulleted list:
- the opening is arranged in the center of said plate
- said opposite first members are arranged colinearly
- said opposite second members are arranged collinearly
- said direction indicator extends in the elongate direction of said plate and said members are oriented crosswise to said elongate direction and extend along the width of said plate
- a first surface of the first member and a second surface of the second member of each fork are configured to allow pivoting of the plate about an axis
- at least a part of the first surface and at least a part of the second surface are in the form of at least a part of a lateral area of a cylinder or in the form of at least a part of a lateral area of an elliptic cylinder or in the form of at least a part of a lateral area of a triangle
- at least a part of a cross-section of the first member and the second member is in the form of at least a part of a circle, at least a part of an ellipse, at least a part of a triangle, or at least partially annular
- the first surface of the first member of the first fork faces the second surface of the second member of the first fork and the first surface of the first member of the second fork faces the second surface of the second member of the second fork the axis of pivoting is orientated perpendicular or substantially perpendicular to a longitudinal direction of the plate an aspect ratio of the plate is greater than 1.5, 2.0, 2.5, 3.0, 3.5, 4.0, 4.5, or 5.0 the device is configured to be accommodated in a housing of the compass the shaft is arranged substantially perpendicular to a bottom of the housing the detection means comprises a permanent magnet the detection means comprises a neodymium magnet the indicator device includes at least one spacer element the indicator device includes two spacer elements which project from the plate of the indicator device at opposite ends of the plate at least a part of at least one of the indicator device, the plate, the support, the first fork, and the second fork is made of plastic material the opening in the plate of the indicator device is formed to interlock with a base of the forks of the magnetic field detection device, thus horizontally aligning the plate and the magnetic field detection device According to a second aspect of the present invention, there is provided a compass comprising a device according to any one of claims 1-18.

According to a third aspect, the present invention relates to the use of a device according to any one of claims 1-18 in a housing of a compass.

Considerable advantages are obtained by certain embodiments of the invention. A device for a compass is provided. In particular, a device comprising a tilt-compensating indicator device for a compass having a magnetic field detection means which is mounted on a conical pivot bearing and which is located in a housing of the compass is provided.

The dimensions of the conical cavity in the support are configured to allow oblique alignment of the magnetic field detection device in respect to the shaft under magnetic field inclination. The dimensions of the conical cavity in the support are further configured to allow oblique alignment of the magnetic field detection device in respect to tilting the device for a compass in the North-South direction and/or the East-West direction. Allowable tilting tolerances are dependent on the form of the conical cavity. Increasing a radius of the opening of the conical cavity in relation to a height of the conical cavity increases the tilting tolerances. According to certain embodiments, care should be taken in that the wall of the conical cavity, i.e. the inside wall of the support, is smooth and that when increasing tilt and/or inclination, no other part of the device touches any surface of a compass construction before the wall of the conical cavity touches the shaft, especially a conical surface of the tip of the shaft, as this will create a repeatable way of managing friction.

The device according to certain embodiments of the present invention reduces manufacturing complexity, and thus also increases cost efficiency. In particular, greater tolerances can be allowed during production and therefore less expensive materials can be used with maintained performance and function.

Further, the device according to certain embodiments of the present invention reduces yield loss during production. Furthermore, the plate of the indicator device may be, for example, made of plastic material, and thus no aluminium needle is required. The indicator may be made of a transparent PET film, for instance.

Additionally, the plate of the indicator device provides more freedom for needle graphics due to the large surface area of the plate. Balancing of the plate of the indicator device is not required at the production line.

Yet further, the magnet carrier and the forks may be made, for example, from plastic material assembled with snap fit. A steel hub does not need to be provided. The device for a compass can be manufactured in industrial scale.

EMBODIMENTS

In this document, a fork is defined as an object having two separate members between which another object such as a portion of a plate can be placed. In other words, the fork is designed to serve as a holder or support for a plate.

Certain embodiments of the present invention relate to a device for a compass, the device comprising a support comprising a magnetic field detection means and a direction indicator device possessing a non-rigid connection in respect to the movement of the magnetic field detection means. The direction indicator device comprises a plate providing an opening in the plate. A portion of the support extends through the opening. The direction indicator device is supported by a first fork and a second fork of the support. The forks are configured to allow pivoting of the direction indicator device about an axis.

Figure 1:
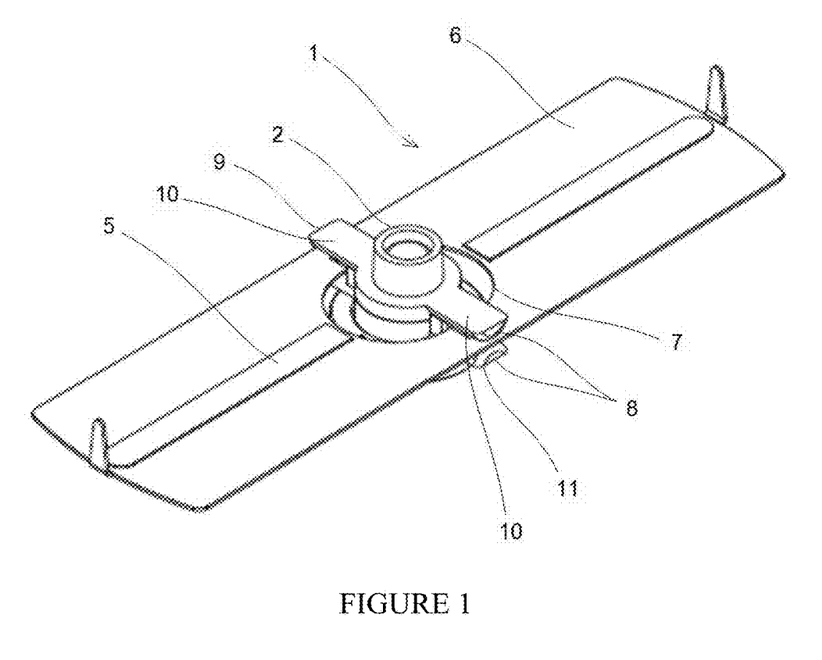
FIG. 1 illustrates a schematic perspective view from the top of a device for a compass in accordance with at least some embodiments of the present invention.

In FIG. 1 a schematic perspective view from the top of a device 1 for a compass in accordance with at least some embodiments of the present invention is illustrated. The device 1 comprises a support 2 comprising a magnetic field detection means. Further, the device comprises a direction indicator device 5. The direction indicator device 5 comprises a plate 6 providing an opening 7 in the center of the plate 6. At least a part of the indicator device 5 may be, for example, made from a transparent PET film. Typically, an aspect ratio (length l/width w) of the plate 6 is greater than 1.5, 2.0, 2.5, 3.0, 3.5, 4.0, 4.5, or 5.0. In other words, the plate 6 can be considered as an elongate plate, wherein the length l is greater than the width w. A relatively large surface area is provided by means of the plate 6, thus also providing freedom for any needle graphics. A portion of the support 2, i.e. a middle portion of said support 2, extends through the opening 7. The support 2 may be made from transparent plastic material, for instance. Additionally, the support 2 comprises a first fork 8 and a second fork 9. The forks 8, 9 support the direction indicator device 5. Also the forks 8, 9 may be made from plastic material, for example from Grilamid TR 55. The first fork 8 and the second fork 9 are arranged on opposite sides of the support 2. The forks 8, 9 are orientated substantially perpendicular to a North-South direction of the indicator device 5. Each fork 8, 9 comprises a first member 10 being arranged above a portion of the plate 6 and a second member 11 being arranged below a portion of the plate 6. In other words, a portion of the plate 6 is arranged between the members 10, 11 of the first fork 8 and the second fork 9. A part of the first member 10 of the first fork 8 and a part of the first member 10 of the second fork 9 are arranged colinearly. Additionally, a part of the second member 11 of the first fork 8 and a part of the second member 11 of the second fork 9 are arranged colinearly. The support further comprises a permanent magnet 3.

Figure 2:
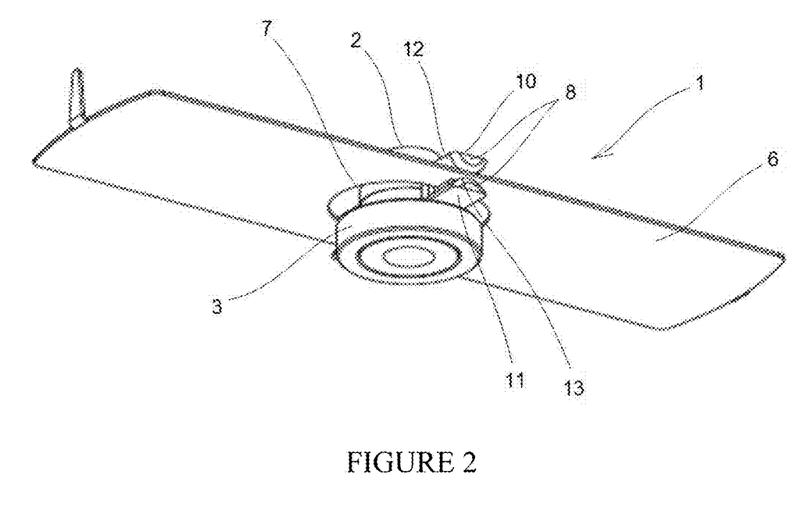
FIG. 2 illustrates a schematic perspective view from the bottom of a device for a compass in accordance with at least some embodiments of the present invention.

In FIG. 2 a schematic perspective view from the bottom of a device 1 for a compass in accordance with at least some embodiments of the present invention is illustrated. The device includes the features shown in FIG. 1. It can be further seen that the first and second members 10, 11 of the forks 8, 9 each comprise a respective surface 12, 13 facing the plate 6. A first surface 12 of the first member 10 and a second surface 13 of the second member 11 of each fork 8, 9 are configured to allow pivoting of the plate 6 about an axis. Typically, at least a part of the first surface 12 and at least a part of the second surface 13 are in the form of at least a part of a lateral area of a cylinder or in the form of at least a part of a lateral area of an ellipse. In other words, at least a part of a cross-section of the first member 10 and the second member 11 of the forks 8, 9 is in the form of at least a part of a circle or an ellipse.

The first surface 12 of the first member 10 of the first fork 8 faces the second surface 13 of the second member 11 of the first fork 8 and the first surface 12 of the first member 10 of the second fork faces 9 the second surface 13 of the second member 11 of the second fork 9.

Figure 3:
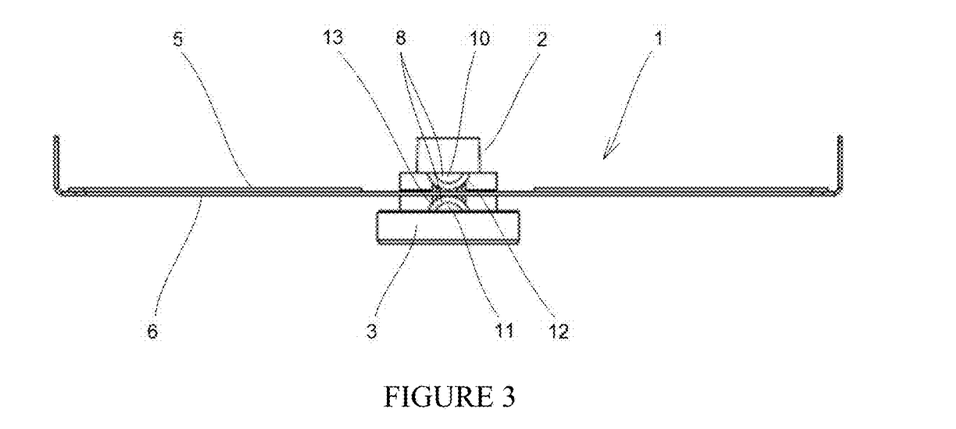
FIG. 3 illustrates a schematic side view of a device for a compass in accordance with at least some embodiments of the present invention.

In FIG. 3 a schematic side view of a device 1 for a compass in accordance with at least some embodiments of the present invention is illustrated. The device includes the features shown in FIG. 1 and FIG. 2. It can be seen that the first surface 12 of the first member 10 and the second surface 13 of the second member 11 of the first fork 8 are configured to allow pivoting of the plate 6 about an axis. At least a part of the first surface 12 and at least a part of the second surface 13 of the members 10, 11 of the first fork 8 are in the form of at least a part of a lateral area of a cylinder. In other words, at least a part of a cross-section of the first member 10 and the second member 11 of the forks 8, 9 is in the form of at least a part of a circle.

The second fork 9 is not visible in FIG. 3. The axis of pivoting is located between the first member 10 of the forks 8, 9 and the second member 11 of the forks 8, 9. The axis of pivoting is orientated perpendicular or substantially perpendicular to the longitudinal direction of the plate 6.

Figure 4:
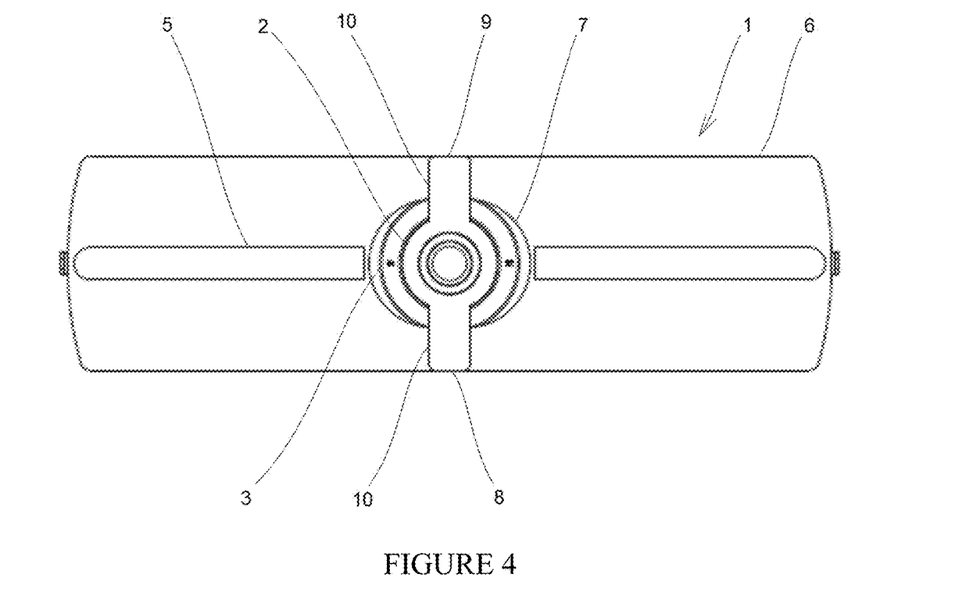
FIG. 4 illustrates a schematic top view of a device for a compass in accordance with at least some embodiments of the present invention.

In FIG. 4 a schematic top view of a device 1 for a compass in accordance with at least some embodiments of the present invention is illustrated. As can be seen, the forks 8, 9 are orientated substantially perpendicular or perpendicular to a North-South direction of the indicator device 5. The plate 6 of the direction indicator device 5 may be, for example, substantially rectangular or rectangular. The opening 7 through the center of the plate 6 may be in the form of a circle or an ellipse, for instance.

Figure 5:
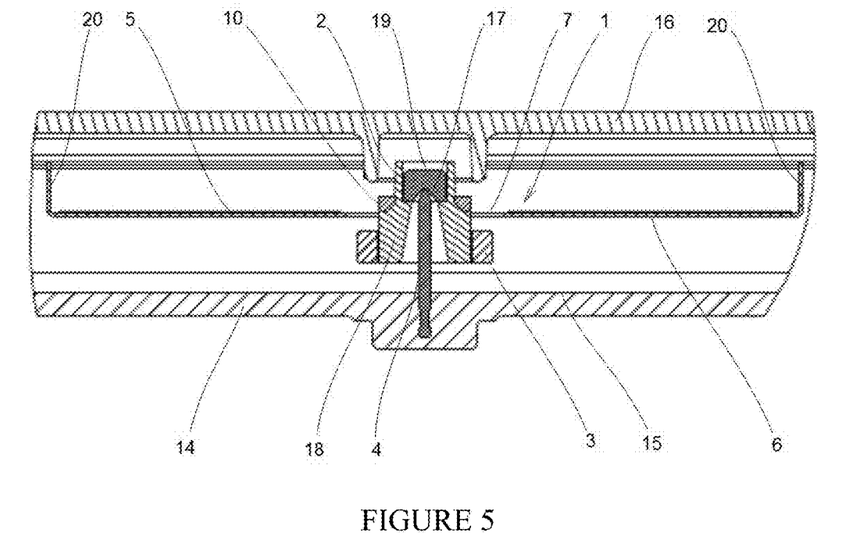
FIG. 5 illustrates a schematic cross-sectional view of a device arranged in a housing of a compass in accordance with at least some embodiments of the present invention.

In FIG. 5 a schematic cross-sectional view of a device 1 arranged in a housing 14 of a compass in accordance with at least some embodiments of the present invention is illustrated. In FIG. 5 the device 1 is arranged in a housing 14 of a compass of which only a transparent top 16 and a bottom 15 are illustrated. The bottom 15 may also be transparent. The compass housing 14, which is bounded by the top 16 and the bottom 15, can preferably contain a liquid or a gas which serves mainly to damp the movement of the indicator 5. A support 2 is mounted via a pivot bearing 19 located on the tip 17 of a shaft 4 to the bottom 15. The support 2 comprises a magnetic field detection means including the pivot bearing 19 which is located on the tip 17 of the shaft 4, the pivot bearing being preferably manufactured from synthetic sapphire or ruby, a magnet carrier 18 which is coupled to the pivot bearing 19, and a permanent magnet 3. The permanent magnet 3 preferably has an annular shape. The permanent magnet can be, for example, a neodymium magnet. The pivot bearing 19, together with the tip 17 of the shaft 4, forms a compass bearing exhibiting very low friction and permitting the magnet carrier 18 to move through a large range of travel. The support 2 further includes the first member 10 which is attached to the magnet carrier 18.

The detection means is capable of rotating in at least a plane which is perpendicular to the direction of the shaft 4. Additionally, an direction indicator device 5 possessing a non-rigid connection in respect to the movement of the magnetic field detection means in said plane is coupled to the support 2. The indicator device 5 comprises a plate 6 providing an opening 7 in the center of the plate 6. A portion of the support 2 extends through the opening 7 of the plate 6. At each of the two ends of the plate 6 a spacer element 20 is provided.

Figure 6:
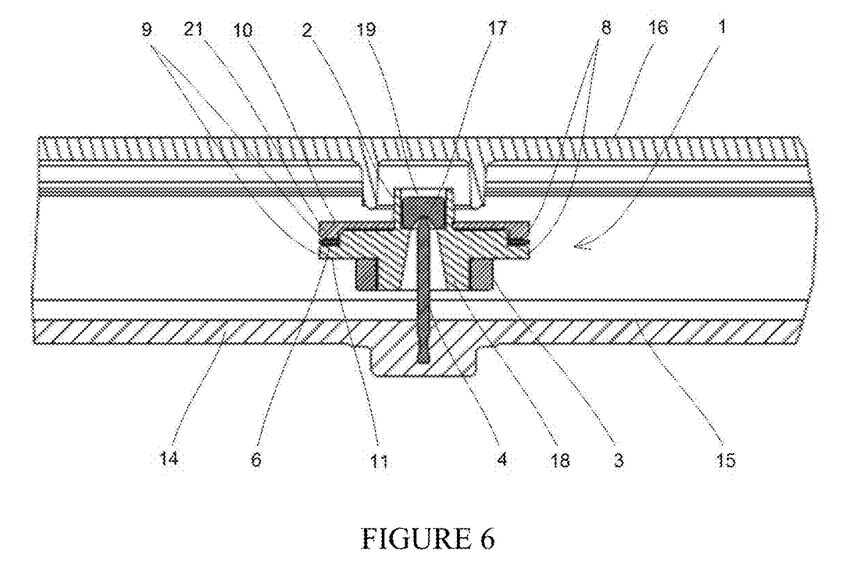
FIG. 6 illustrates another schematic cross-sectional view of a device arranged in a housing of a compass in accordance with at least some embodiments of the present invention.

In other words, the spacer elements 20 are spaced from the magnetic field detection means. The spacer elements 20 project from the direction indicator device 5 and are directed towards one of a top 16 of the housing 14 of the compass and a bottom 15 of the housing 14 of the compass. By this structure, the indicator device 5 is guidable in the housing 14 of the compass substantially-parallel to at least one of the top 16 of the housing 14 of the compass and the bottom 15 of the housing 14 of the compass by being mechanically pushed off at least from one of the top 16 of the housing 14 of the compass and the bottom 15 of the housing of the compass by the spacer elements 20 when the housing 14 is tilted. In addition, the spacer elements 20 which are arranged on the indicator device 5 are oriented in respect to the top 16 of the housing 14 of the compass or the bottom 15 of the housing 14 of the compass in such a manner that an abutting of the indicator device 5 against the housing 14 of the compass can be prevented. In FIG. 5, the spacer elements 20 project from the indicator device 5 towards the top 16 of the housing 14. According to other embodiments, the spacer elements 20 project from the indicator device 5 towards the bottom 15 of the housing 14. The support 2 furthermore comprises a first fork and a second fork as shown in FIG. 6. The forks support the indicator device 5. If the compass housing 14 of the compass is tilted in the North-South direction of the magnetic field detection means, the permanent magnet 3 orients itself obliquely to the tip 17 of the shaft 4. The construction will also allow the permanent magnet 3 to orient itself obliquely to the tip 17 of the shaft 4 under influence form the inclination of the magnetic field while the indicator device stays roughly parallel to the compass housing.

In FIG. 6 another schematic cross-sectional view of a device 1 arranged in a housing 14 of a compass in accordance with at least some embodiments of the present invention is illustrated. According to the shown embodiment, the second member 11 of the first fork 8 and the second fork 9 is an integral part of the magnet carrier 18. The first member 10 of the first fork 8 and the second fork 9 is formed by a single piece which is attached to the magnet carrier 18. At both ends of the first member 10 a protrusion is formed which faces a portion of the plate 6. The portion of the plate 6 is arranged between the first member 10 and the second member 11 of the forks 8, 9. If the compass housing 14 of the compass is tilted in the East-West direction of the magnetic field detection means, the permanent magnet 3 orients itself obliquely to the tip 17 of the shaft 4.

Figure 7:
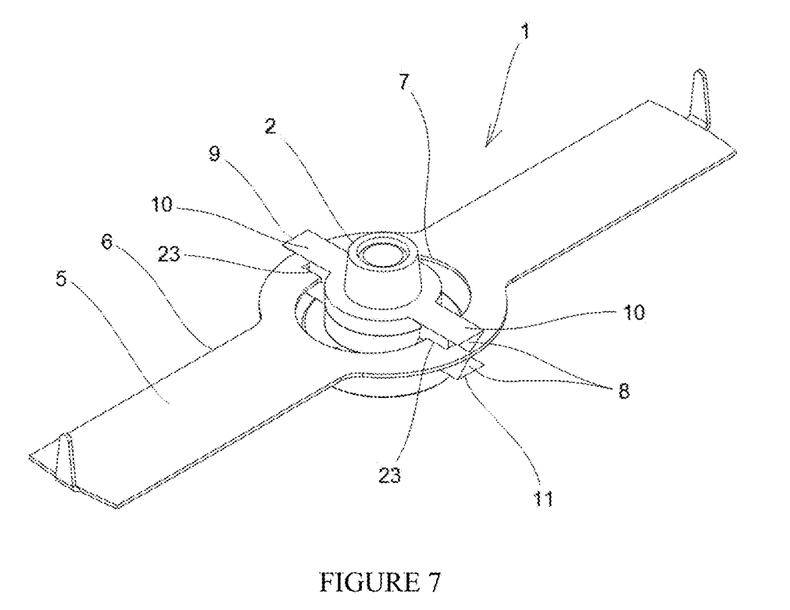
FIG. 7 illustrates a schematic perspective view from the top of another device for a compass in accordance with at least some embodiments of the present invention.

In FIG. 7 a schematic perspective view from the top of another device 1 for a compass in accordance with at least some embodiments of the present invention is illustrated. The footprint of the plate 6 of the direction indicator device 5 differs from the footprint of the plate 6 of the direction indicator device 5 shown e.g. in FIG. 1. In particular, the footprint is more of an arrow type. Additionally, at least a part of a cross-section of the first member 10 and at least a part of a cross-section of the second member 11 of the forks 8, 9 is in the form of a triangle. Further, indentations 23 are shown in the plate 6 of the indicator device 5. The indentations 23, corresponding parts of the support 2, which parts are arranged in the respective indentation 23, as well as the forks 8, 9 limit the degrees of freedom of the direction indicator device 5 to move. The device is configured to only allow pivoting of the plate 6 of the indicator device 5 about an axis.

Figure 8:
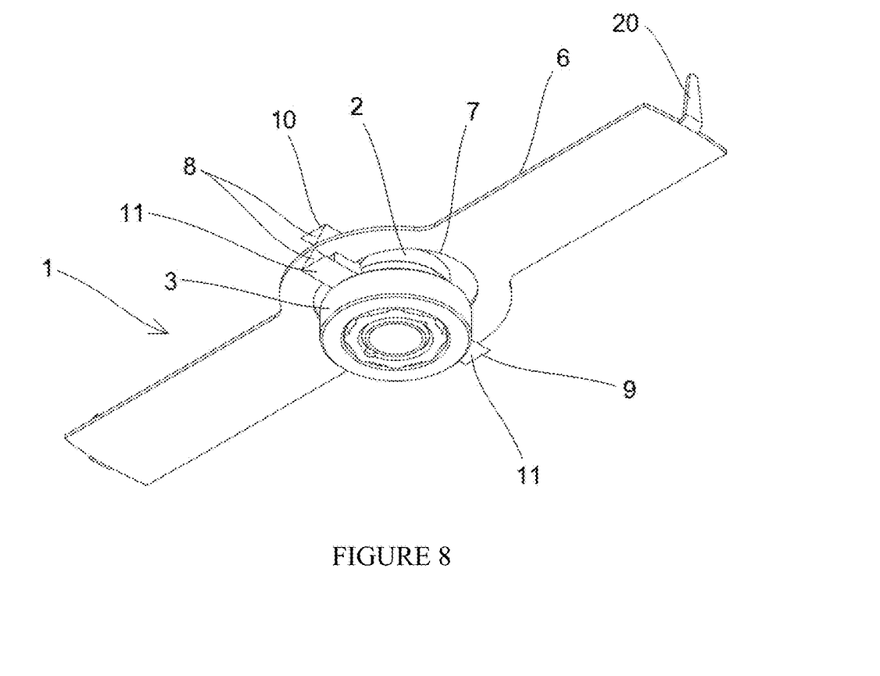
FIG. 8 illustrates a schematic perspective view from the bottom of another device for a compass in accordance with at least some embodiments of the present invention.

In FIG. 8 a schematic perspective view from the bottom of another device 1 for a compass in accordance with at least some embodiments of the present invention is illustrated.

Figure 9:
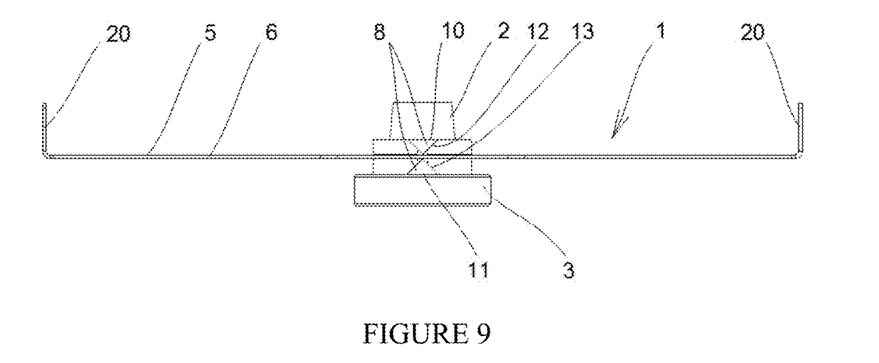
FIG. 9 illustrates a schematic side view of another device for a compass in accordance with at least some embodiments of the present invention.

In FIG. 9 a schematic side view of another device 1 for a compass in accordance with at least some embodiments of the present invention is illustrated. A part of a cross-section of the first member 10 and a part of a cross-section of the second member 11 of the forks 8, 9 is in the form of a triangle. A first surface 12 of the first member 10 and a second surface 13 of the second member 11 of each fork 8, 9 are configured to allow pivoting of the plate 6 about an axis. The pivoting axis is located between the two tips of the triangular members 10, 11 of the forks 8, 9. The pivoting axis is orientated substantially perpendicular or perpendicular to the longitudinal direction of the plate 6 of the direction indicator device 5.

Figure 10:
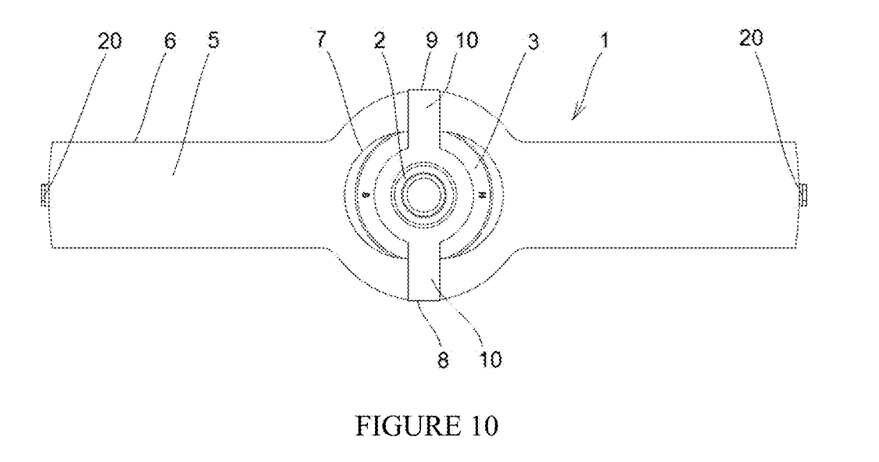
FIG. 10 illustrates a schematic top view of another device for a compass in accordance with at least some embodiments of the present invention.

In FIG. 10 a schematic top view of another device 1 for a compass in accordance with at least some embodiments of the present invention is illustrated. The footprint of the plate 6 of the indicator device 5 differs from the footprint of the plate 6 of the indicator 5 device shown e.g. in FIG. 1.

Figure 11:
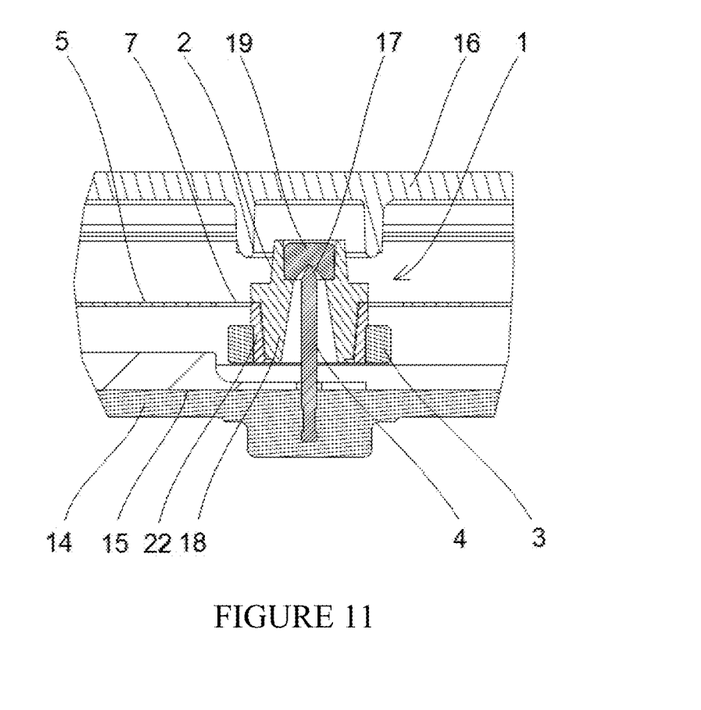
FIG. 11 illustrates a schematic cross-sectional view of another device arranged in a housing of a compass in accordance with at least some embodiments of the present invention.

In FIG. 11 a schematic cross-sectional view of another device 1 arranged in a housing 14 of a compass in accordance with at least some embodiments of the present invention is illustrated. The support 2 further comprises a wedge 22 between the magnet carrier 18 and the permanent magnet 3. The wedge 22 is configured to hold the magnet 3 in place.

Figure 12:
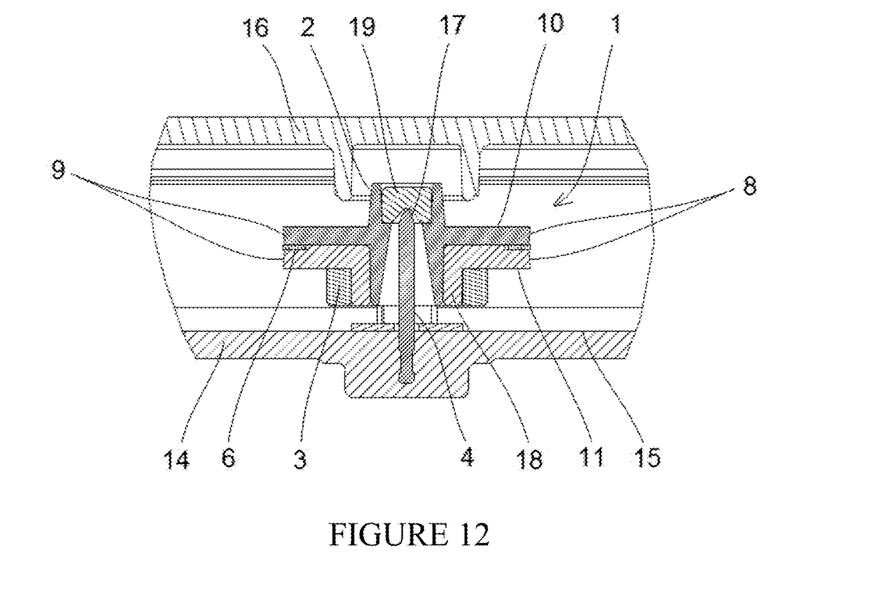
FIG. 12 illustrates another schematic cross-sectional view of another device arranged in a housing of a compass in accordance with at least some embodiments of the present invention.

In FIG. 12 another schematic cross-sectional view of another device 1 arranged in a housing of a compass in accordance with at least some embodiments of the present invention is illustrated. Contrary to the embodiment shown in FIG. 6, the first member 10 of the first fork 8 and the second fork 9 is an integral part of the support 2. The second member 11 of the first fork 8 and the second fork 9 is an integral part of the magnet carrier 18.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in production of a compass.

REFERENCE SIGNS LIST 1 device
2 support
3 magnet
4 shaft
5 direction indicator device
6 plate
7 opening
8 first fork
9 second fork
10 first member
11 second member
12 first surface
13 second surface
14 housing
15 bottom
16 transparent top
17 tip
18 carrier
19 pivot bearing
20 spacer element
21 protrusion
22 wedge

CITATION LIST

Patent Literature

U.S. Pat. No. 5,233,759
U.S. Pat. No. 6,094,830
U.S. Pat. No. 6,105,265

The invention claimed is:

1. A device for a compass, the device comprising:
a support comprising a magnetic field detector being mounted via a conical pivot bearing on a tip of a shaft, wherein the magnetic field detector is capable of rotating in at least a plane which is perpendicular to the direction of the shaft, and
a direction indicator device connected to the magnetic field detector,
wherein
the support comprises an upper portion, a middle portion and a lower portion, and
the direction indicator device comprises an elongate plate with a direction indicator, wherein:
the middle portion of said support extends through an opening in the plate,
the upper portion of said support comprises opposite first members extending over the top surface of said plate,
and the lower portion of said support comprises opposite second members extending under the bottom surface of said plate, and
said first and second members are vertically and pairwise aligned to form a first fork and a second fork supporting the plate.

2. The device according to claim 1, wherein the opening is arranged in the center of said plate.

3. The device according to claim 1, wherein said opposite first members are arranged colinearly.

4. The device according to claim 1, wherein said opposite second members are arranged colinearly.

5. The device according to claim 1, wherein said direction indicator extends in the elongate direction of said plate and said members are oriented crosswise to said elongate direction and extend along the width of said plate.

6. The device according to claim 1, wherein a first surface of the first member and a second surface of the second member of each fork are configured to allow pivoting of the plate about an axis.

7. The device according to claim 6, wherein at least a part of the first surface and at least a part of the second surface are in the form of at least a part of a lateral area of a cylinder or in the form of at least a part of a lateral area of an elliptic cylinder or in the form of at least a part of a lateral area of a triangle.

8. The device according to claim 6, wherein at least a part of a cross-section of the first member and the second member is in the form of at least a part of a circle, at least a part of an ellipse, at least a part of a triangle, or at least partially annular.

9. The device according to claim 6, wherein the first surface of the first member of the first fork faces the second surface of the second member of the first fork and the first surface of the first member of the second fork faces the second surface of the second member of the second fork.

10. The device according to claim 6, wherein the axis of pivoting is orientated perpendicular or substantially perpendicular to a longitudinal direction of the plate.

11. The device according to claim 1, wherein an aspect ratio of the plate is greater than 1.5.

12. The device according to claim 1, wherein the device is configured to be accommodated in a housing of the compass.

13. The device according to claim 12, wherein the shaft is arranged substantially perpendicular to a bottom of the housing.

14. The device according to claim 1, wherein the magnetic field detector comprises a permanent magnet.

15. The device according to claim 1, wherein the magnetic field detector comprises a neodymium magnet.

16. The device according to claim 1, wherein the indicator device includes at least one spacer element.

17. The device according to claim 1, wherein the indicator device includes two spacer elements which project from the plate of the indicator device at opposite ends of the plate.

18. The device according to claim 1, wherein at least a part of at least one of the indicator device, the plate, the support, the first fork, and the second fork is made of a plastic material.

19. A compass comprising a device for a compass, the device comprising:
a support comprising a magnetic field detector being mounted via a conical pivot bearing on a tip of a shaft, wherein the magnetic field detector is capable of rotating in at least a plane which is perpendicular to the direction of the shaft, and
a direction indicator device connected to the magnetic field detector,
wherein
the support comprises an upper portion, a middle portion and a lower portion, and
the direction indicator device comprises an elongate plate with a direction indicator, wherein:
the middle portion of said support extends through an opening in the plate,
the upper portion of said support comprises opposite first members extending over the top surface of said plate,
and the lower portion of said support comprises opposite second members extending under the bottom surface of said plate, and
said first and second members are vertically and pairwise aligned to form a first fork and a second fork for supporting the plate.

* * * * *